July 10, 1962 J. B. LATTAY 3,043,390
ENGINE COOLING AIR SYSTEM FOR TRACTORS
Filed March 30, 1960

INVENTOR
James B. Lattay
BY
Pennie, Edmonds, Morton, Barrows & Taylor
ATTORNEYS

United States Patent Office 3,043,390
Patented July 10, 1962

3,043,390
ENGINE COOLING AIR SYSTEM FOR TRACTORS
James B. Lattay, Lake Waccamaw, N.C., assignor to Riegel Paper Corporation, New York, N.Y., a corporation of Delaware
Filed Mar. 30, 1960, Ser. No. 18,701
3 Claims. (Cl. 180—54)

This invention relates generally to engine cooling systems and more particularly to an improved arrangement for supplying engine cooling air for the operation of tractors or other mobile equipment used in the removal of undergrowth from woodlands or other terrain.

For various reasons, the large scale removal of woodland undergrowth is necessary in certain industries, for example, in growing and harvesting wood pulp in the paper industry. It has been found that where tractors or other mobile equipment have been engaged in woodland operations of this type that the equipment may be out of service for 25% of normal operating time because of engine overheating problems. Tractors and other similar equipment usually water-cool their engines by circulating engine heated water through a radiator. Conventionally, an engine driven fan is used to pull cooling air through the radiator, and to blow the air back across the engine block. Unfortunately, small bits of undergrowth such as leaves, small plants, etc., may be carried by the cooling air to clog the air passages of the radiator. As might be expected, these deposits result in the gradual loss of efficiency of the cooling system and serious overheating problems. Radiators thus clogged, require the shutdown of machines in order to remove the debris with a consequent loss of valuable operating time. In addition, the constant repetitive overheating of an engine shortens its useful operating life and often requires higher than average repair maintenance.

The present invention avoids the foregoing problem by providing an engine air cooling system for tractors and the like, wherein air is blown forward through the radiator to maintain the cooling air passages thereof free of debris as the tractor forges ahead through woodland undergrowth. The invention also provides means for preventing the cooling air from being heated by the engine and advantageously, the same means will prevent the entrainment of debris in the cooling air which is blown against and through the radiator from the inside thereof.

In a specific embodiment disclosed herein a tractor having a conventional water-cooled engine system and a radiator mounted at its forward end, is equipped with a rearwardly facing air scoop having an outlet somewhat above and to the rear of an engine driven pusher-type fan. Additionally, at each side and extending somewhat rearwardly from the radiator casing to a position encompassing a forward portion of the engine are provided sheet metal side shields. Attached to the side shields and perpendicular thereto are transverse shields which are fitted against the engine block. The side and transverse shields, together with the engine hood, form a closed duct about the engine fan which is thus permitted to pull air efficiently from the air scoop, the air then being blow forward through the radiator. This ducting arrangement prevents the flow of air to the fan from around rearward portions of the heated engine and also precludes the possible flow of air and entrained debris to the fan from either side of the tractor.

These and other aspects of the invention will become more readily apparent upon an examination of the following detailed description of a particular embodiment and of the accompanying drawings in which.

Figure 1:
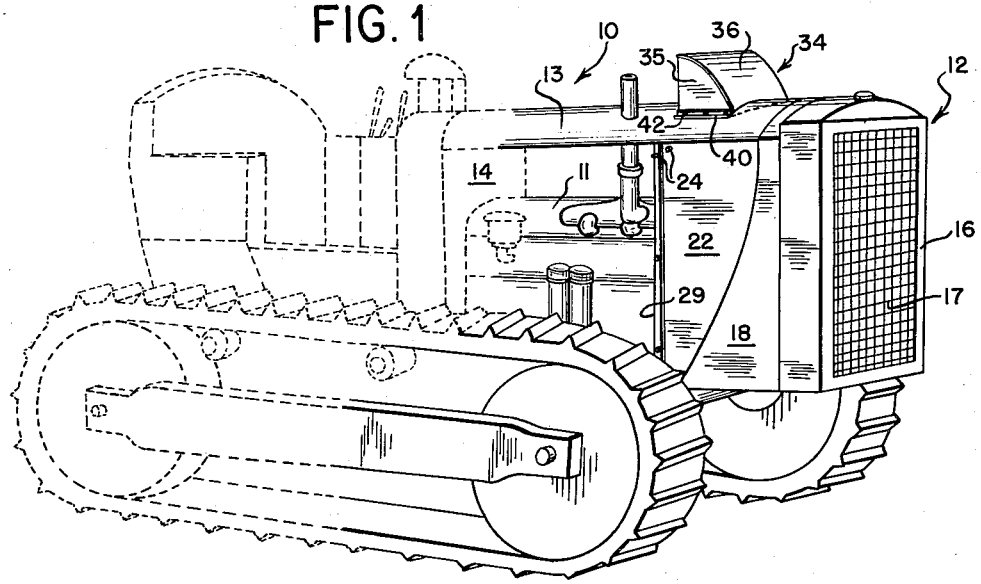
FIG. 1 is a perspective view, partially in phantom, of a tractor which has been equipped with an engine air cooling system according to the present invention.

Referring now to the drawings, a tractor 10, used in the clearing of undergrowth from woodland terrain has a conventional water-cooled internal combustion engine 11. The water coolant is circulated through the radiator 12 mounted at the forward end of the tractor. The engine 11 is equipped with a hood 13 which extends forward from the fire wall 14 to the radiator 12. In the view shown in FIG. 1, the radiator 12 has been provided with an outer casing 16, having a grill or screen 17 attached thereto to afford protection for the cooling tubes (not shown) of the radiator. The tractor 10 may also have as standard equipment, side plates 18, 19 which extend from the radiator casing 16 rearwardly as shown.

According to the present invention, two side shields 22, 23 are attached by bolts 24 at the upper edges thereof to the hood 13 and at their lower edges by suitable brackets or clamps 26 to the plates 18, 19 and to portions of the tractor chassis 27, 28. Also provided are two transverse shield members 29, 30 which are attached to the side shields 22, 23 and are fitted against the engine block. The transverse shields 29, 30 will extend across the top of the engine block 11 and may meet as indicated at 32. The members 18, 19, 22, 23, 29 and 30 are fitted together substantially in sealed relationship, and the transverse shields 29, 30 where fitted against the engine block 11, also maintain a generally sealed relationship therewith.

Situated above the shields 22, 23 and mounted on the hood 13 somewhat to the rear of the forward portion of the engine 11, is an air scoop 34. The scoop 34 may be constructed of sheet metal plates 35–37 and as shown may be somewhat triangular in outline. An opening (not shown) will be cut or otherwise provided in the hood 13 immediately beneath the scoop 34 so that air may pass through a rearwardly facing intake opening 38 therein which in the illustrated embodiment has been covered with a wire mesh 39, made of spark arrestor wire.

In fitting the scoop 34 to the hood 13, the lower edge of plate 36 may be permitted to extend for a short distance beneath the surface of the hood (as indicated by the dotted line in FIG. 1). The two plates 35, 37 forming the sides of the scoop may also be equipped at the lower edges thereof with suitable elongate brackets 40, 41 which may, if desired, be provided with a sealing strip of felt or rubber (not shown). The brackets 40, 41 will be fastened to the hood by conventional fasteners, such as, sheet metal screws, 42.

Figure 2:
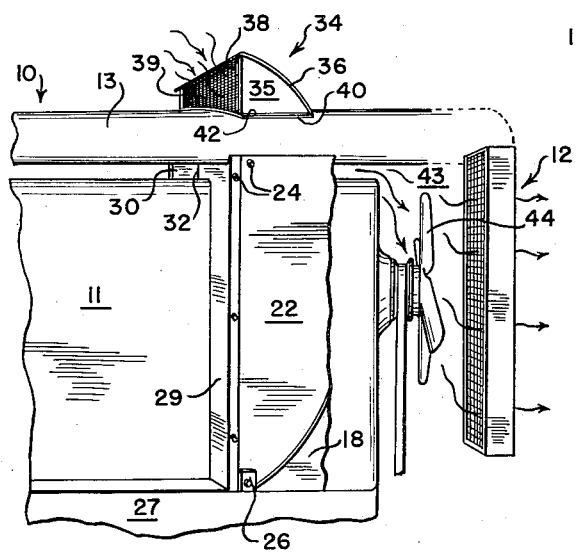
FIG. 2 is a side view, partially broken away, of the cooling arrangement of FIG. 1; and, FIG. 3 is a view looking forward showing the manner in which the transverse rearwardly positioned shields fit against forward portions of the engine block.
Figure 3:
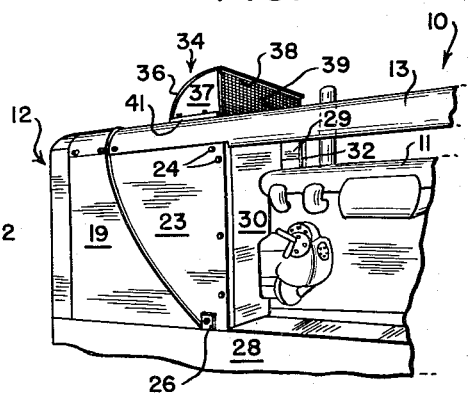

Thus, it will be seen with reference to FIG. 2, that the radiator 12, the hood 13 and the sheet metal plates or shield members 18, 19, 22, 23, 29 and 30 encase a forward portion of the engine 11 to form a chamber 43. Although it has not been specifically illustrated, the lower portion of the chamber 43 will be substantially enclosed against the admission of exterior air thereto by portions of the tractor chassis which support the radiator 12 and by the sheet metal splash guards normally provided as standard equipment. It will be understood that where the conventional chassis and splash guards do not completely seal the bottom portions of the chamber 43, that additional sheet metal plates may be fastened as required to provide complete sealing of the bottom portions of the chamber.

As an engine driven pusher-type fan 44 is mounted behind the radiator 12 and is adapted to pull cooling air from the scoop 34 (as illustrated by the arrows in FIG. 2) and to direct the air thus received forwardly through the cooling passages or interstices of the radiator 12. The cooling air received by the fan 44 is taken from an area above the hood 13 which is sufficiently removed from the engine 11 as to be effective in maintaining the circulating water coolant in the radiator 12 at the desired temperature. The efficiency of the fan in pulling air through the scoop 34 will be materially assisted by the sheet metal members 18, 19, 22, 23, 29 and 30 which encase the forward portion of the engine 11. Consequently, chamber 43 may, in effect, be sealed against the admission of air from any source, except the air scoop 34. This obviates the intrustion of hot air from around the engine 11 and also avoids air flow containing debris which might be sucked into the fan from the sides of the tractor.

It will be understood that the foregoing description of a particular embodiment is merely representative, and that in order to fully appreciate the spirit and scope of the invention, reference should be made to the appended claims in which—

I claim:

1. A cooling air intake and exhaust system for cooling an engine of a crawler-type tractor or the like of the type having an engine, an exposed radiator mounted forward of the engine, and a fan between the radiator and the engine, and wherein the engine is cooled by circulating a liquid coolant through a radiator mounted at the forward end of the tractor, comprising a means for driving said fan by said engine for propelling cooling air in a forward direction outwardly through said radiator, a hood covering said engine, an air scoop mounted on said hood and projecting upward therefrom, said air scoop having an intake opening facing rearwardly and an outlet through said hood, and duct means including means engaging said engine and encasing said fan in a substantially enclosed chamber to isolate said fan from said engine, said air scoop having its outlet communicating with said chamber to supply cooling air to said fan.

2. A cooling air intake and exhaust according to claim 1 wherein said duct means includes forward portions of the engine hood, side shield members fitted to said radiator and shield members attached to said side shield members and engaging forward portions of the engine.

3. A cooling air intake and exhaust system according to claim 1 in which said air scoop is located above and to the rear of said fan.

References Cited in the file of this patent

UNITED STATES PATENTS

| | | |
|---|---|---|
| 1,754,257 | Britt | Apr. 15, 1930 |
| 1,882,319 | Gurney | Oct. 11, 1932 |
| 1,920,883 | Perkins | Aug. 1, 1933 |
| 2,680,490 | Dafoe | June 8, 1954 |
| 2,697,490 | Taber | Dec. 21, 1954 |
| 2,896,595 | Guillo-Quevedo | July 28, 1959 |
| 2,920,829 | Shane | Jan. 12, 1960 |

FOREIGN PATENTS

| | | |
|---|---|---|
| 846,037 | Germany | Aug. 7, 1952 |